United States Patent [19]

Pierick et al.

[11] Patent Number: 5,111,929
[45] Date of Patent: May 12, 1992

[54] SPIRAL CONVEYOR CLEANING SYSTEM

[75] Inventors: Richard L. Pierick, Crystal; Ross A. Hoium, Brooklyn Park, both of Minn.

[73] Assignee: Checker Machine, Inc., New Hope, Minn.

[21] Appl. No.: 690,561

[22] Filed: Apr. 24, 1991

[51] Int. Cl.⁵ .............................................. B65G 45/22
[52] U.S. Cl. ..................................... 198/495; 62/380; 134/145; 134/151; 99/443 C
[58] Field of Search ............ 198/495, 494; 62/303, 62/374, 380; 134/144, 145, 151, 153; 99/443 C, 365

[56] References Cited

U.S. PATENT DOCUMENTS

| | | | |
|---|---|---|---|
| 2,617,515 | 11/1952 | Hohnecker | 198/494 |
| 3,245,131 | 4/1966 | Kimble | |
| 3,834,408 | 9/1974 | Thalacker | |
| 4,363,263 | 12/1982 | Williams | |
| 4,582,047 | 4/1986 | Williams | |
| 4,623,060 | 11/1986 | Rulke | 198/495 |
| 4,701,242 | 10/1987 | Scarano et al. | 198/495 |
| 4,792,303 | 12/1988 | Stewart et al. | |
| 4,830,175 | 5/1989 | Durst et al. | 198/495 |
| 4,941,819 | 7/1990 | Stewart et al. | |

Primary Examiner—Joseph E. Valenza
Attorney, Agent, or Firm—Haugen and Nikolai

[57] ABSTRACT

A steam cooking device includes an endless conveyor arranged in a spiral path surrounding a cage. The cage is rotatable on a vertical axis to drive the endless conveyor, thus to move food along the helical path as it is cooked. A cleaning system for the device includes a fixed manifold of nozzles for spraying the conveyor, a whirling nozzle within the cage, and a spray bar. The spray bar moves along the helical path as the cage rotates, and carries a plurality of nozzles that spray a cleaning fluid onto the structure that supports the endless conveyor. Leading and trailing nozzles spray radially disposed cantilevered carrier rods, while pairs of nozzles, along the top of the moving bar, spray opposite sides of rails mounted on the carrier bars and supporting the conveyor. After the cleaning cycle, the spray bar is removed and the device is ready for food preparation.

28 Claims, 5 Drawing Sheets

SPIRAL CONVEYOR CLEANING SYSTEM

BACKGROUND OF THE INVENTION

The present invention relates to devices for treating food products and other items, and more particularly to a system for cleaning such devices.

Endless conveyors are frequently employed to transport and handle materials. In the food preparation industry, an endless chain or belt frequently is housed within an enclosure, and arranged in a spiral path whereby a relatively long path is confined within the enclosure. As food items are carried along the path by the conveyor, they are steam cooked, frozen or otherwise treated. The conveyor length and speed determine the treatment duration, to provide continuous as opposed to batch treatment of the food product. This type of device is shown in U.S. Pat. No. 3,834,408 (Thalacker).

In addition to food, this type of conveyor is used to handle other products as well. For example, the Thalacker patent discloses an apparatus for cleaning small electrical parts. The cleaning apparatus carries the parts on an endless chain supported on a helical track. Various nozzles in the apparatus spray a cleaning solvent or solvent condensate onto the parts, which then proceed to a drying region above the nozzles, heated by a spiral steam jacket.

U.S. Pat. No. 4,792,303 (Stewart et al) discloses a bread baking oven with a dual spiral conveyor. A heat distribution system within the oven includes ribbon burners, plenums for receiving gases heated by the burners, and a fan for drawing air through the plenums. From the plenums, heated air is provided to discharge tubes distributed along the spiral conveyor.

When these devices are used in conveying and treating food, cleanliness is of paramount concern. Environments in which food is cooked, frozen, warmed or otherwise treated must be free of harmful bacteria or other contamination, that can spoil or otherwise damage the food, and may lead to serious harm if the affected food is consumed. In ovens, freezers and the like employing spiral belts or chains, devices can be mounted along the path of the belt to spray a cleaning fluid upon the belt as it passes. Further, stationary nozzles can be located throughout the interior of an oven or freezer. However, these approaches have been found less than satisfactory for cleaning the fixed structure that supports the endless belt or other conveyor. Consequently, the support structure must be cleaned by hand, a tedious and time consuming task. Because much of the belt support structure is difficult to see and virtually impossible to reach by hand, manual cleaning runs the risk of falling short of the strict requirements for sanitary handling of food.

Therefore, it is an object of the present invention to provide a food handling and conveying apparatus that is self-cleaning and requires virtually no cleaning by hand.

Another object of the invention is to provide a cleaning system for use in connection with spiral conveyors, that is particularly well suited for cleaning the structure that supports the endless conveyor in its helical path.

A further object is to provide a spraying manifold supported on an endless conveyor and movable along the spiral path traversed by the conveyor, for spraying a cleaning fluid upon the endless conveyor support structure along substantially the entire spiral path.

Yet another object is to provide a manifold of spray nozzles that is quickly and conveniently mounted for use in cleaning a spiral conveyor, then quickly detachable upon completion of the cleaning cycle.

SUMMARY OF THE INVENTION

To achieve these and other objects, there is provided a material conveying apparatus. The apparatus includes an endless conveyor means. A stationary carrier means supports the endless conveyor means by gravity for movement along a predetermined path. A drive means, mounted with respect to the endless conveyor means, moves the endless conveyor means along the path. The apparatus further includes fluid spraying means. A coupling means supports the fluid spraying means for travel along the predetermined path, responsive to movement of the drive means. A fluid providing means supplies a cleaning fluid under pressure to the fluid spraying means, thereby causing the spraying means to direct the cleaning fluid onto the carrier means as the spraying means travels along the path.

The preferred spraying means is an elongate manifold carrying a plurality of spray nozzles and supported by gravity on the conveying means. The endless conveyor, when in a helical path, can be driven by a tension drive in combination with a rotating a cylindrical cage, with conveyor speed determined by the tension drive. The cage is concentric on the helix axis and surrounded by the endless conveyor. In this event the manifold is coupled to the cage for rotation with the cage, but also is free to slide or otherwise travel vertically relative to the cage. The manifold extends radially outwardly of the cage, and spans the width of the chain or other conveyor.

The carrying means typically includes a plurality of upright members arranged concentrically about the helix axis. A plurality of horizontal rods are fixed to each upright member and extend radially inward toward the cage in cantilever fashion. A set of carrier rails, spaced apart from one another, are mounted on the carrier rods in spiral curves. The conveyor is supported by the rails, on wear strips attached to and covering the top edge portions of the rails.

As it travels along the spiral path, the spraying manifold directs cleaning fluid upwardly, onto the carrier rods, wear strips and carrier rails above it. The nozzles are arranged to ensure that all exposed surfaces of the rods, wear strips and rails are sprayed directly, for a thorough, complete cleaning of the carrier structure, to ensure the requisite sanitary conditions for conveying and handling food products.

The cleaning system is designed to facilitate its retrofit into conventional ovens and other equipment utilizing central cages to drive spiral conveyors. More particularly, a slight modification to the cage facilitates mounting a fluid conduit housing to move vertically relative to the cage and to rotate with the cage. Water or other cleaning fluid is supplied to the housing through stationary piping section, and a movable piping section that rotates with the cage and is joined to the stationary section through a swivel connection. A hose couples the movable piping section to the fluid conduit housing. The manifold is releasibly coupled to the housing through a hydraulic coupling assembly including a quick coupling element mounted on the manifold at its radially inward end. A link, attached to the coupling element and running the length of the manifold, facilitates manipulation of the quick coupling element from the more conveniently accessible radially outward end of the manifold.

Thus, in accordance with the present invention, a manifold or bank of spray nozzles traverses the spiral path of an endless conveyor, moved along the path by the central cage that drives the conveyor. As it travels, the manifold sprays cleaning fluid upon the exposed surfaces of conveyor supporting structure, along the entire path length. The moving manifold, used in combination with a centrally positioned whirling nozzle and a fixed manifold for cleaning the conveyor itself, provides a system for thoroughly cleaning an oven, freezer or other device with an enclosed spiral conveyor.

IN THE DRAWINGS

For a further appreciation of the above and other features and advantages, reference is made to the following detailed description of the invention and the drawings, in which.

DETAILED DESCRIPTION OF THE PREFERRED EMBODIMENT

Figure 1:
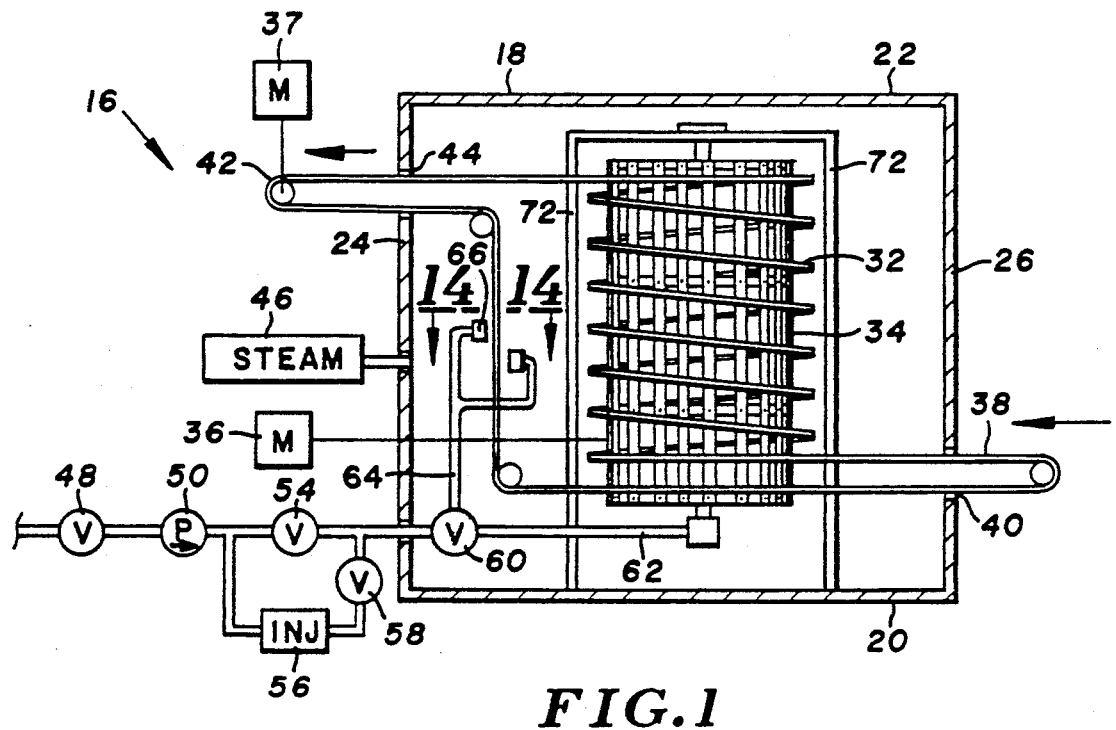
FIG. 1 is an elevation in section of a steam cooking device constructed in accordance with the present invention.

Turning now to the drawings, there is shown in FIG. 1 a steam cooking device 16 for serially conveying and continuously cooking food products. Uncooked meat, poultry, and other foods are loaded into the device, carried along a predetermined path within the device at a speed commensurate with the prescribed cooking time, and removed from the device as ready to eat or ready to package precooked products.

Figure 2:
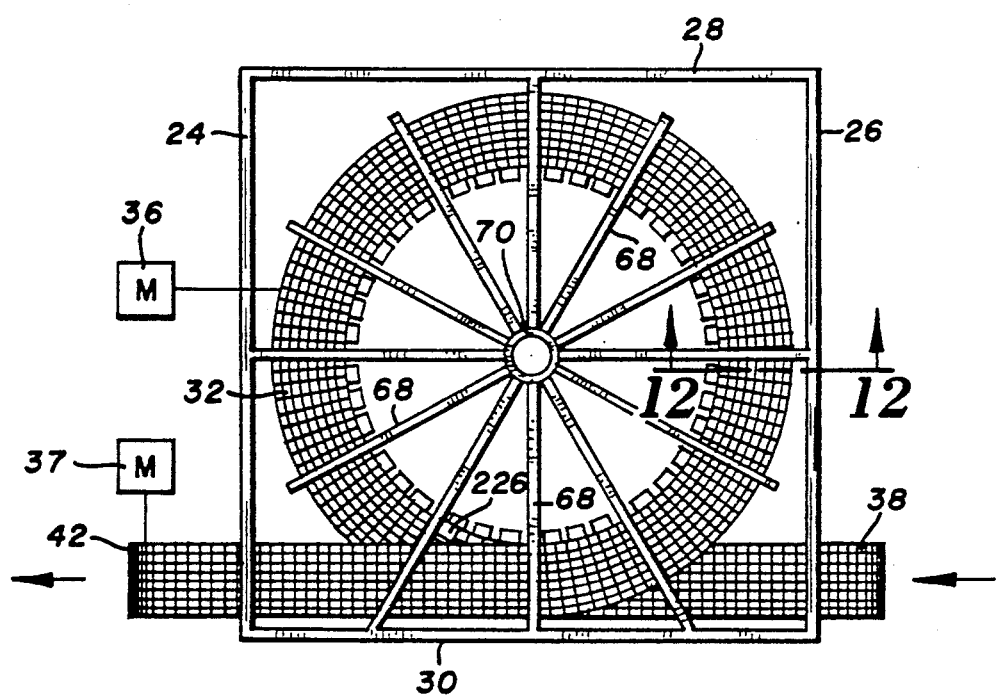
FIG. 2 is a top plan view of the device in FIG. 1.

The cooking device includes a rectangular enclosure or casing 18 having a horizontal base 20, a horizontal top 22, and vertical side walls joining the top and bottom including opposite side walls 24 and 26, a rear wall 28 and a forward wall 30 (FIG. 2). The top, base and walls define a chamber inside device 16, and are constructed of stainless steel or other material that is durable and suitable for handling food. The top, base and side walls further preferably include thermally insulative lining.

Inside of cooking device 16 is an endless belt conveyor 32. Over the majority of its length, conveyor 32 is formed into a helical or spiral path about an upright cylindrical drive cage 34. Cage 34 is driven by a motor 36 to rotate about a vertical axis. Chain conveyor 32 moves with the cage by virtue of a tightly wrapping, frictional engagement of the conveyor about the cage. A tension motor 37 cooperates with the cage in moving conveyor 32. Parts of endless conveyor 32 extend beyond the cooking device interior. More particularly, a receiving portion 38 of the conveyor extends through an inlet opening 40 in side wall 26. A discharge portion of 42 the conveyor extends through a discharge opening 44 near the top of side wall 24. Although not shown in FIG. 1, preferably there is a take-up system on the return path as belt 32 re-enters enclosure 18 through discharge opening 44.

Food to be cooked is loaded onto receiving portion 38. Continuous motion of chain conveyor 32 carries the food into the chamber, upwardly along the spiral path to the top of cage 34, then out of the chamber through opening 44, where the cooked food is discharged. A steam generator 46 provides steam to maintain the chamber at the desired temperature. The cooking process is based upon the chamber temperature and the duration over which each food item remains in the chamber, controlled by the conveyor length and conveyor speed.

A cleaning system for cooking device 16 includes equipment for supplying water under pressure to the chamber. A valve 48 is provided in piping connected to a source of water (not shown), e.g. a direct well or municipal water supply. The water is heated, although a water heater is not shown in the figure. Water from a pump 50 is provided to the chamber along a fixed piping section 52 through a valve 54. If desired, a water soluble cleaning solvent can be added to the water supply through an injector or pump 56 and into the water stream through a valve 58.

Inside of cooking device 16, a three way ball valve 60 joins a fixed horizontal piping section 62 and a fixed vertical piping section 64. Vertical section 64 supplies water to fixed manifolds 66 and 67 utilized to spray cleaning fluid upon belt conveyor 32 as it passes the manifolds.

In FIG. 2, top 22 is removed from the cooking device to reveal part of a fixed framework that supports endless conveyor 32 in its ascending helical path. More particularly, a plurality of horizontal bars 68 extend radially outwardly from a central ring 70. The radially outward end of each horizontal bar is supported by an upright bar 72. Two of upright bars 72 are shown in FIG. 1, on opposite sides of drive cage 34.

Figure 3:
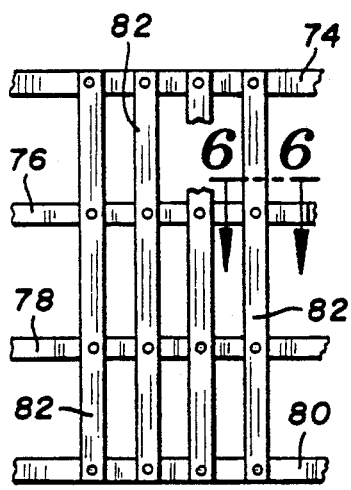
FIG. 3 is an elevation of the drive cage.

The drive cage is constructed of four horizontal support frames having outer annular rims 74, 76, 78 and 80 (FIG. 3) and multiple uprights 82 fastened to the rims by multiple nut and bolt fasteners. The cage is supported for rotation about the vertical axis, clockwise as viewed in FIG. 2. Cage rotation causes chain conveyor 32 to rotate in the clockwise direction as well, by virtue of frictional engagement between the inner edge of the conveyor and the radially outward surfaces of uprights 82. Although there is some slippage of the conveyor relative to the cage, the conveyor tends to move at approximately the angular speed of the cage such that food items carried on the conveyor tend to travel from inlet 40 to discharge opening 44 at a substantially constant speed as set by tension motor 37.

Figure 4:
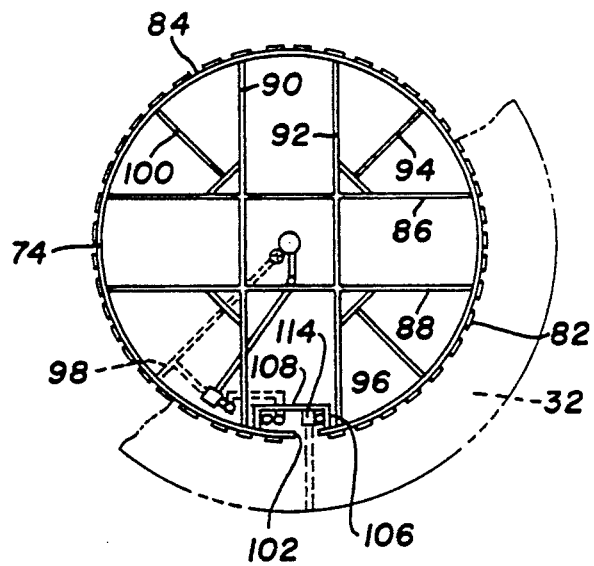
FIG. 4 is a top plan view of a central drive cage of the device.

A top support frame 84 is shown in greater detail in FIG. 4. The frame includes outer rim 74 and a reinforcing framework, all preferably constructed of stainless steel. The reinforcing framework includes two parallel and spaced apart main bars 86 and 88 that span substantially the diameter of the rim. These main bars appear horizontal as viewed in FIG. 4. Cross supports are provided in sections welded to rim 74 and bars 86 and 88, to form parallel and spaced apart cross members 90 and 92 (horizontal in FIG. 4). Intermediate T-shaped support members are welded the main bars cross members and rim, as indicated at 94, 96, 98 and 100.

In accordance with the invention, outer rims 74, 76, 78 and 80 are modified to form four vertically aligned gaps between adjacent uprights 82. One of these gaps is shown at 102 in FIGS. 4 and 7. To maintain the width of gap 102 and the integrity of rim 74, opposed spacers 104 and 106 are welded to the rim, and connected integrally by a reinforcing bar 108. A C-shaped channel 110 is secured to spacer 104, and an opposed channel 112 is mounted to spacer 106. The channels support a hose and a fluid conducting housing 114 for vertical movement within cage 34, as is to be explained. While only uppermost cage support frame 84 is shown and described in detail, it is to be appreciated that the top and bottom cage support frames are substantially identical. The intermediate rims (76 and 78) do not require the support bars and support members.

Figure 5:
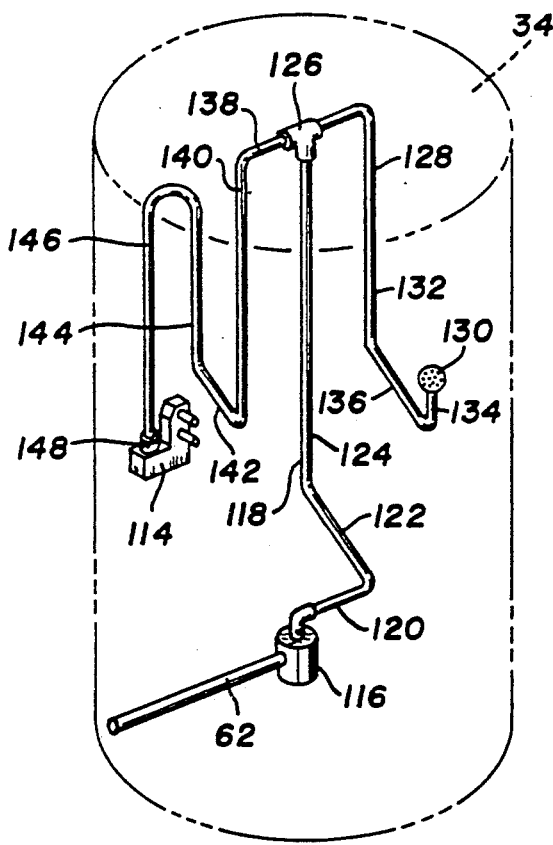
FIG. 5 is perspective view of a cleaning fluid conveying system in the device.

FIGS. 4 and 5 illustrate the structure for conducting water or other cleaning fluid to the interior of drive cage 34. More particularly, a swivel joint 116 receives water via fixed pipe section 62. A swivel joint available from Reelcraft and rated at 3,000 pound psi has been found satisfactory. Swivel joint 116 maintains a fluid tight connection from pipe section 62 to a pipe assembly 118 that rotates with cage 34. The movable pipe assembly includes a section with horizontal portions 120 and 122, and a vertical portion 124 inside the cage near its periphery. At the top of portion 124 is a three-way ball valve 126. A pipe section 128 conducts fluid from the ball valve to a generally spherical whirling nozzle 130. The whirling nozzle has a plurality of angularly spaced apart nozzle openings, and spins on a vertical axis as it receives fluid under pressure, thus to provide a complete (360 degrees) spray angle as it washes the inside of cage 34. Nozzle 130 preferably is constructed either of stainless steel or Teflon (brand) material. Pipe section 128 includes vertical portions 132 and 134, and a horizontal portion 136, that position nozzle 130 at about the center of the drive cage, both vertically and radially.

A pipe section 138 also is connected to the ball valve for receiving fluid, and includes a vertical portion 140 and a horizontal portion 142 to position a remote end 144 of the section near the periphery of the cage. Fluid conducting housing 114 is coupled to pipe section 138 through a flexible hose 146.

Figure 7:
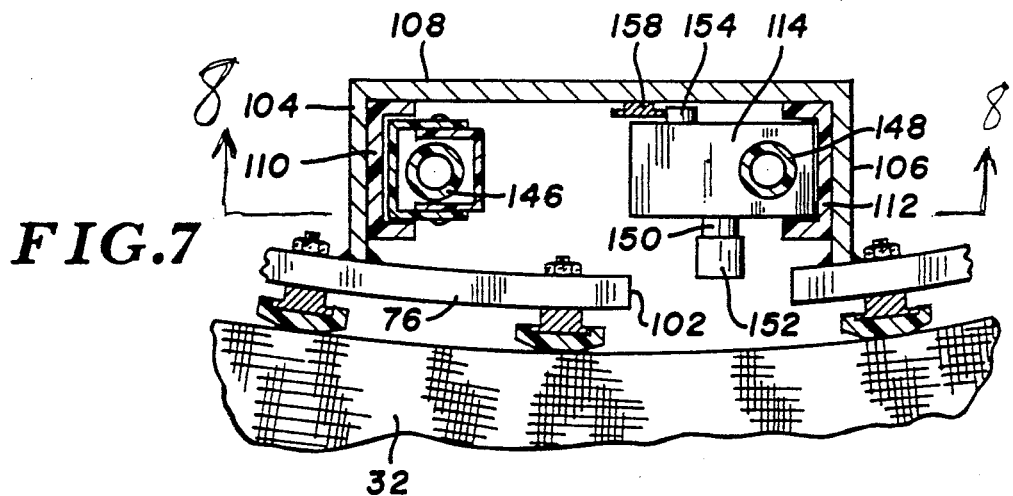
FIG. 7 is an enlarged view of a portion of FIG. 4.

As seen in FIG. 7, fluid conducting housing 114 includes a fluid inlet 148 for receiving fluid from hose 146. The connection of the hose and housing 114 can be a standard, threaded type of hose connection. The portion of the housing proximate inlet 148 is supported slidably in channel 112, to permit the housing to move vertically relative to cage 34, while being constrained to rotate with the cage.

A fluid outlet tube 150 is mounted to housing 114 and extends radially outward from the housing, through gap 102 when the housing is aligned with support frame 84. At the end of tube 150 is a male quick coupling element 152 of a quick coupling assembly. The quick coupling assembly is a hydraulic coupling available from Aeroquip, and preferably is stainless steel or brass. Male coupling element 152 is modified, in that its poppet valve or stop is removed, and an enlarged end bore is formed, to promote the draining of liquid when the cleaning cycle is complete.

Figure 10:
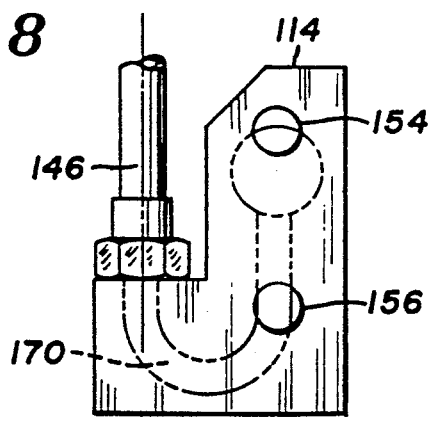
FIG. 10 is an elevational view of a fluid conduit housing used in the device.
Figure 12:
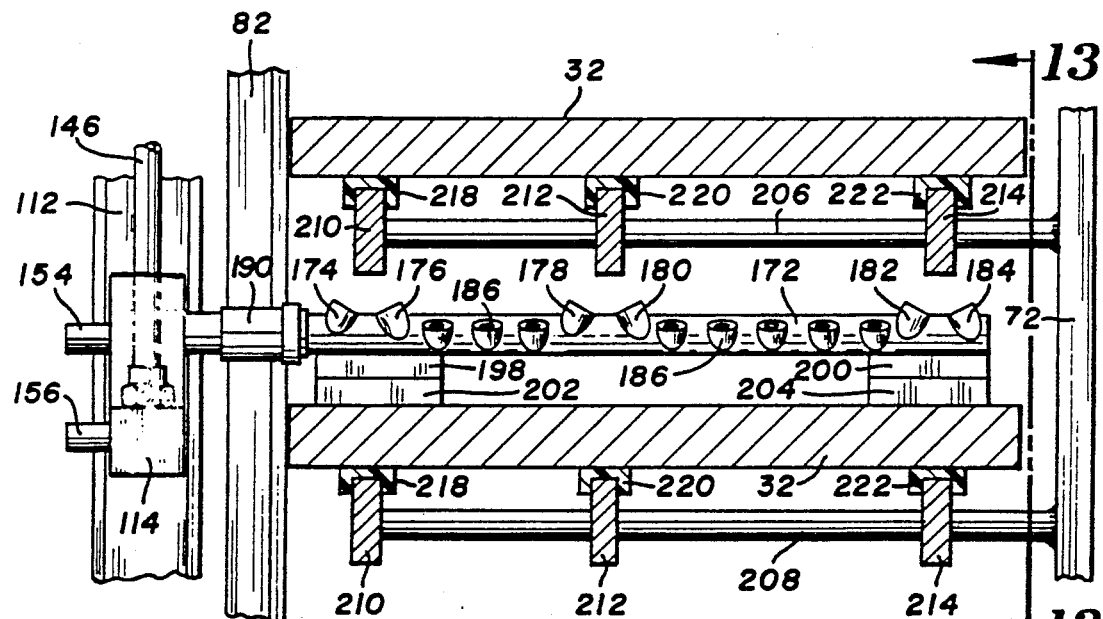
FIG. 12 is a sectional view taken along the Line 12—12 in FIG. 2.

Extending radially inward from housing 114 are a pair of pins 154 and 156 (FIGS. 10 and 12). Pins 154 and 156 bear against a T-shaped vertical retainer 158 that spans substantially the height of the cage. Retainer 158 prevents housing 114 from rotating counterclockwise as viewed in FIG. 7, when a nozzle manifold is coupled to the housing and the cage is rotating. The retainer, preferably constructed of stainless steel, is fastened to the reinforcing bars of the support frames.

Figure 6:
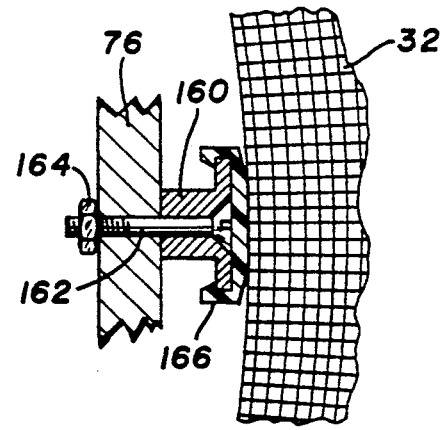
FIG. 6 is a sectional view taken along the Line 6—6 in FIG. 3.

FIG. 6 shows one of uprights 82, and its mounting to intermediate rim 76. The upright includes an elongate aluminum column 160. An opening through column 160 accommodates a flat head bolt 162, which also extends through an opening in rim 76. A nut 164 retains the bolt. Finally, a polymeric wear strip 166 covers column 160.

Figure 8:
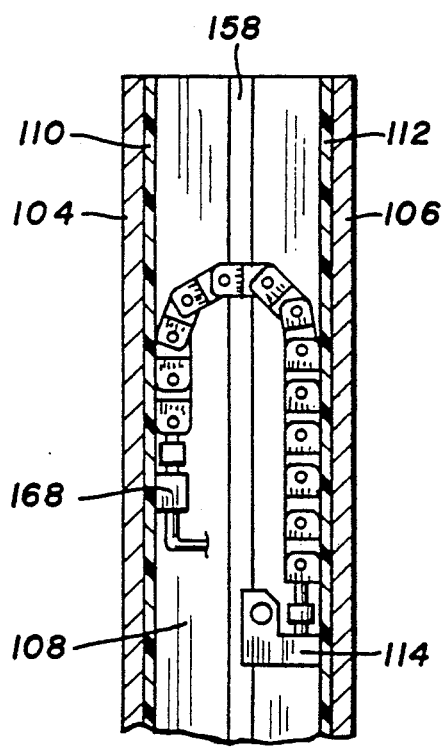
FIGS. 8 and 9 are sectional views taken along the line 8—8 in FIG. 7.
Figure 9:
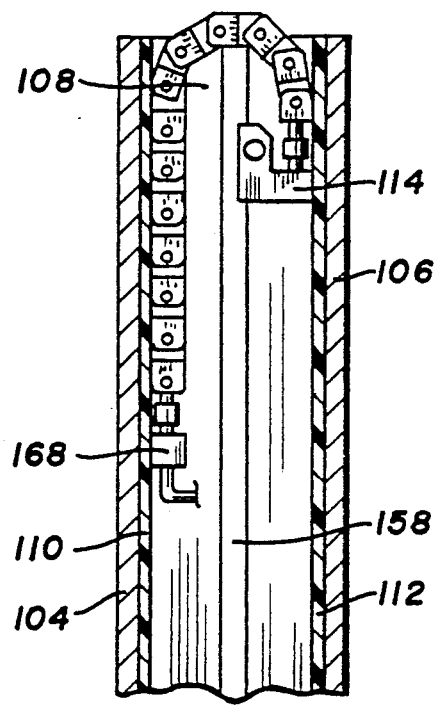

FIGS. 8 and 9, viewing hose 146 from outside of cage 34, illustrate the manner in which the hose accommodates vertical travel of housing 114. To ensure that hose 146 does not kink or deviate from the arch shown in these figures, a chain of stainless steel or plastic links surrounds the hose. The chain links are part of a molded plastic cable drag chain available from Kable Schlepp under the brand name "Plastitrak". One of the links, indicated at 168 in FIGS. 8 and 9, is secured to channel 110 by bolts to fix the point where the inlet end of the hose is secured to pipe section 138. The remaining links are not secured and, particularly near the discharge end of the hose, are free to slide along channel 112 with housing 114. The housing also is supported slidably along retainer 158 by virtue of pins 154 and 156. FIG. 10 shows housing 114 as viewed from within cage 34. Broken lines at 170 indicate the path of fluid received from hose 146 as it travels through the housing toward tube 150.

Figure 11:
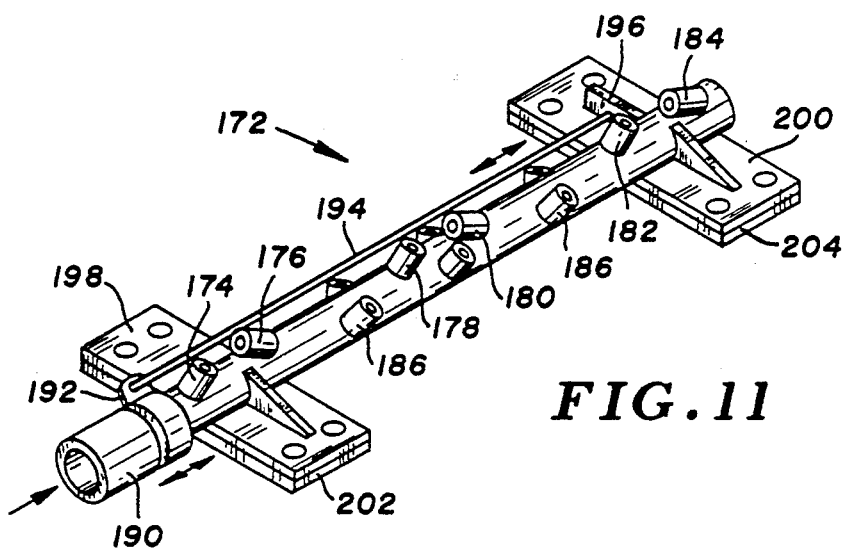
FIG. 11 is a perspective view of a spray bar releasibly connectable to the fluid conduit housing.

Fluid exiting the housing is provided to a manifold or spray bar 172, shown in FIG. 11. Spray bar 172 supports a plurality of nozzles, including three opposed pairs of nozzles along the top, indicated at 174 and 176, 178 and 180, and 182 and 184. Along its leading surface, the spray bar carries a set of lead nozzles 186. Along its trailing surface, spray bar 172 carries a set of trailing nozzles 188 (FIG. 13) similar to the lead nozzles.

At one end of the spray bar is a sleeve or female quick coupling element or sleeve 190, which cooperates with coupling element 152 in rapidly connecting the spray bar with housing 114, and alternatively in rapidly disconnecting these components. Sleeve 190 is at the radially inward end of the spray bar when mounted, in a position where direct access to manipulate the sleeve is difficult. Accordingly, a tab 192 is welded or otherwise fastened to the sleeve, and a link 194 couples tab 192 to a lever 196 at the radially outward end of the spray bar. Thus, sleeve 190 is manipulated by hand, remotely from a point of convenient access, to quickly couple and decouple the spray bar. A slide plate 198, preferably constructed of stainless steel, is welded to the bottom of spray bar 172 near the end supporting sleeve 190. A slide plate 200 is likewise mounted to the opposite end of the spray bar. A low friction, polymeric pad is mounted to the bottom of each plate as indicated at 202 and 204, respectively.

As seen in FIG. 12, spray bar 172 is supported on belt conveyor 32 by gravity, through the plates and pads. When coupled to housing 114 through quick coupling elements 152 and 190, spray bar 172 carries the housing upwardly along channel 112 as the spray bar ascends the helical path.

The nozzles carried by spray bar 172 are advantageously positioned to thoroughly and completely clean all exposed surfaces of the conveyor supporting structure. The support structure (FIG. 12) includes carrier rods 206 and 208, welded to upright bar 72 and extended radially inward from the upright bar in cantilever fashion. A row of such rods extend from the upright bar, each rod beneath one of the tiers of the endless conveyor helix. Rows of carrier rods likewise extend radially inward from the other upright bars.

Figure 13:
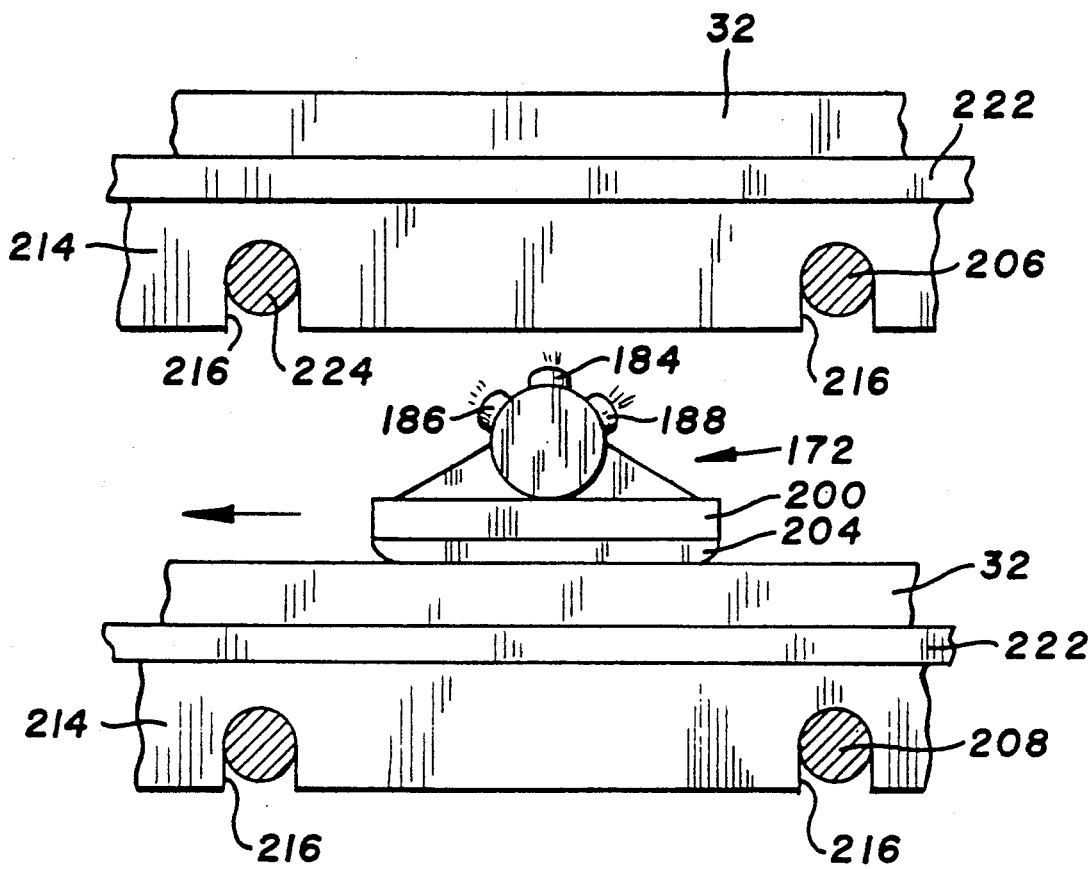
FIG. 13 is a sectional view taken along the Line 13—13 in FIG. 12.

The cantilevered rods support three carrier rails 210, 212 and 214. As seen in FIG. 13, cut-outs 216 are formed in rail 214 to accommodate the carrier rods. Similar cut-outs are formed in the other rails. The distance between adjacent cut-outs is uniform on each rail, but varies from one rail to another. Consequently, the carrier rods support rails 210, 212 and 214 in parallel, spaced apart relation, each rail in a spiral path. To properly secure the support structure, each of the carrier rods is welded to the carrier rails at the cut-outs. As indicated at 218, 220 and 222, an elongate strip of UHMW (ultra high molecular weight) polyethylene or other suitable low friction material is mounted over the top of each rail, and supports chain conveyor 32 for sliding relative to the rails.

The nozzles carried by spray bar 172 are specially positioned for cleaning particular components of the support structure. For example, opposed nozzles 174 and 176 face opposite sides of carrier rail 210, for cleaning the opposite sides and bottom of the rail, and strip 218. Nozzles 178 and 180, and nozzles 182 and 184 are likewise situated with respect to rails 212 and 214, respectively.

As best seen in FIG. 13, lead nozzles 186 direct cleaning fluid onto a carrier rod 224, more particularly onto its rearward exposed surface ("rearward" in terms of the spray bar direction of travel). Meanwhile, trailing nozzles 118 spray the forward surface of the immediately subsequent carrier rod 206, just passed by the spray bar. As spray bar 172 continues to ascend the helical path, i.e. moves relative to the support structure as indicated by the arrow, trailing nozzles 188 will spray the leading surface portions of carrier rod 206, and leading nozzles 186 will spray the next carrier rod (not shown) ahead of rod 224. Thus, the nozzles carried by spray bar 172 as it traverses the spiral path, cooperate to spray virtually all of the exposed surfaces of the cleaning structure including the carrier rods, rails and low friction strips. If desired, the spray bar also can carry a nozzle pointed radially inwardly for spraying wear strips 166 of the cage. Generally nozzles with relatively narrow spray angles are preferred, to provide a more focused, forceful spray upon various exposed surfaces.

When food is being prepared in steam cooking device 16, spray bar 172 is removed. Housing 114 rotates with cage 32, and remains at the bottom of the cage. After cooking and just prior to initiating the cleaning cycle, spray bar 172 is coupled to housing 114, by operating lever 196 to manipulate sleeve 190. Valve 48 is opened and pump 50 operated to supply water at high presser, e.g. 200–850 (preferably 600) psi. Valves 54 and 58 are adjusted, based upon using either water alone or water and an injected cleaning solution. Then, drive motor 36 and tension motor 37 are actuated to rotate cage 34 as in the cooking process. The preferred belt speed during the cleaning cycle is in the range of 5–20 feet per minute.

As the cage rotates, spray bar 172 is carried arcuately and upwardly along the spiral path of chain conveyor 32. In general, the spray bar and conveyor move together, relative to the stationary conveyor support structure. However, because the spray bar is controlled directly by the cage, some slippage occurs between the spray bar and conveyor. As cage 34 rotates, spray bar 172 continues to travel arcuately and upwardly, until it approaches the top of the helical path. As the spray bar reaches the top of the path, it encounters a limit switch 226 (FIG. 1) which generates a signal to stop cage 34. With the cage stopped, spray bar 172 is disconnected from housing 114 and removed, whereupon the housing descends to its starting position at the bottom of the cage. Thus, in traversing each tier of the spiral path, spraying support structure under the next tier above, spray bar 172 effectively cleans virtually the entire stationary support structure.

Figure 14:
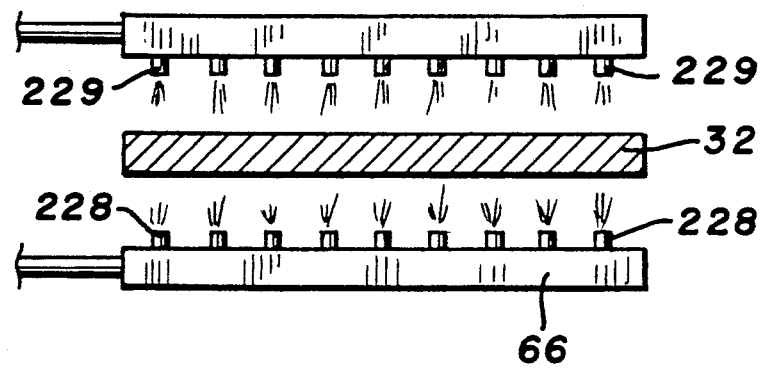
FIG. 14 is a sectional view taken along the Line 14—14 in FIG. 1.

Spray bar 172 is part of a total cleaning system which cleans the cage interior and belt conveyor as well. Fixed manifolds 66 and 67, shown in FIG. 14, include respective rows of nozzles 228 and 229 that span the width of conveyor 32, to cover the entire conveyor as it moves by the fixed manifolds. Manifolds 66 and 67 receive water or other cleaning fluid under pressure via piping section 64. Simultaneously, the cage interior is cleaned by whirling nozzle 130 (FIG. 5).

Thus in accordance with the present invention, a system is provided for cleaning virtually any device in which an endless conveyor traverses a spiral or helical path within a housing. While particularly advantageous in connection with a steam cooking device, the cleaning system also is well suited for coolers, freezers, steamers and other food handling devices, and indeed for stand along spirals and other devices that handle and convey products other than food. The fixed source of cleaning fluid spray upon the moving conveyor, and the spray source that moves along the helical conveyor path, together ensure a complete and thorough cleaning of the structure supporting the endless conveyor, as well as the conveyor itself.

What is claimed is:

1. A material conveying apparatus, including:
   an endless conveyor means;
   a stationary carrier means for supporting the endless conveyor means by gravity along a predetermined path;
   a drive means, mounted with respect to the endless conveyor means, for moving the endless conveyor means along the path;
   a fluid spraying means, and a coupling means for supporting the fluid spraying means for travel along said path responsive to movement of the drive means; and
   a fluid providing means for supplying a cleaning fluid under pressure to the fluid spraying means, thereby causing the spraying means to direct the cleaning fluid onto the carrier means as the spraying means travels along said path.

2. The apparatus of claim 1 wherein:
   said spraying means comprises an elongate manifold and a plurality of spray nozzles mounted to the manifold.

3. The apparatus of claim 2 wherein:

said manifold is disposed with its length dimension substantially normal to the direction of conveying means travel.

4. The apparatus of claim 2 wherein:
said manifold is supported by gravity on the conveying means.

5. The apparatus of claim 1 wherein:
said predetermined path includes a series of tiers about a vertical axis, forming a helix.

6. The apparatus of claim 5 wherein:
said drive means comprises an upright cylindrical cage concentric on and rotatable about the vertical axis, with said conveyor means surrounding the cylindrical cage.

7. The apparatus of claim 6 wherein:
said conveyor means is moved with the cage by virtue of frictional engagement of an interior edge of the conveyor means with the periphery of the cylindrical cage.

8. The apparatus of claim 6 wherein:
said spraying means comprises an elongate manifold extended radially outward form the cage across the conveying means and supporting a plurality of spray nozzles.

9. The apparatus of claim 8 wherein:
said manifold is supported by gravity on the conveying means and, when supported on a given one of said tiers of the helix, sprays the cleaning fluid upon a portion of the carrier means between the manifold and a next tier immediately above the given tier.

10. The apparatus of claim 8 wherein:
the coupling means includes a fluid conducting housing mounted to rotate with said cage about the vertical axis and moveable vertically with respect to the cage, and a coupler assembly for releasably coupling a radially inward end of the manifold to the housing.

11. The apparatus of claim 10 wherein:
the coupler assembly includes a moveable quick release coupling element at the radially inward end of the manifold, and a means for operating the coupling element from a radially outward end of the manifold.

12. The apparatus of claim 11 wherein:
said means operating the coupling element include a link mounted with respect to the coupling element and extended along the length of the manifold.

13. The apparatus of claim 5 wherein:
said carrier means includes a plurality of upright bars arranged concentrically about the vertical axis, a plurality of carrier rods fixed to the upright bars and extended radially inwardly thereof in cantilever fashion, and a plurality of carrier rails spaced apart from one another and mounted on the carrier rods in spiral curves to support the conveyor means.

14. The apparatus of claim 13 wherein:
said spraying means includes an elongate manifold extended radially to span substantially the width of the conveying means, and carrying a plurality of spray nozzles.

15. The apparatus of claim 14 wherein:
said manifold is supported by gravity on the conveying means and, when supported on a first one of said tiers, sprays the cleaning fluid upon the carrier rails and carrier rods that support a next tier immediately above the first tier.

16. The apparatus of claim 15 wherein:
said plurality of nozzles include a pair of nozzles associated with each of the carrier rails, with one nozzle radially inward of the associated rail, and one nozzle radially outward of the associated rail.

17. The apparatus of claim 16 wherein:
said plurality of nozzles further include a first set of nozzles for spraying cleaning fluid generally in the direction of manifold travel along said path, and a second set of nozzles for spraying the cleaning fluid generally in the direction opposite to the direction of manifold travel.

18. The apparatus of claim 1 further including:
an enclosure surrounding the stationary carrier means, and surrounding at least the majority of said endless conveyor means whereby said predetermined path is inside of the enclosure.

19. The apparatus of claim 18 wherein:
the cleaning fluid includes water and cleaning solvent.

20. The apparatus of claim 10 wherein:
said supply means includes a first length of stationary piping, a second length of piping inside of the cage and moving with the cage as the cage rotates, and swivel connection for joining the second length of piping for rotation with respect to the first length of piping, and a hose connected between the second piping section and the fluid conducting housing.

21. The apparatus of claim 20 further including:
a whirling nozzle inside of said cage and in fluid communication with said second piping section.

22. The apparatus of claim 21 further including:
a pair of opposed, vertical tracks and a chain including the plurality of links surrounding the hose and supported along the tracks, for supporting said hose in an arch.

23. An apparatus for cleaning the stationary carrier structure that supports an endless conveyor means by gravity along a predetermined path, said apparatus including:
an elongate manifold and a plurality of spray nozzles mounted to the manifold;
a manifold guide means for causing the manifold to travel along said predetermined path; and
a fluid providing means for supplying a cleaning fluid under pressure to the manifold, thereby causing the nozzles to direct the cleaning fluid onto the stationary carrier structure as the nozzles travel along said predetermined path.

24. The apparatus of claim 23 wherein:
said manifold is supported by gravity on the conveying means, and is disposed with its length dimension substantially normal to the direction of conveying means travel.

25. The apparatus of claim 24 wherein:
said predetermined path includes a series of tiers about a vertical axis, forming a helix.

26. The apparatus of claim 25 further including:
an upright cylindrical cage surrounded by the conveyor means and rotatable about the vertical axis to move the conveyor means.

27. The apparatus of claim 26 wherein:
the manifold guide means includes a fluid conducting housing mounted to rotate with the cage about the vertical axis and movable vertically with respect to the cage, and a coupler assembly for releasably coupling a radially inward end of the manifold to the housing.

28. The apparatus of claim 27 wherein:
the coupler assembly includes a movable quick release coupling element at the radially inward end of the manifold. and a means for operating the coupling element from a radially outward end of the manifold.

* * * * *